(12) United States Patent
Reinhardt et al.

(10) Patent No.: US 10,567,533 B2
(45) Date of Patent: *Feb. 18, 2020

(54) SYSTEM AND METHOD TO DETERMINE THE PRESENCE STATUS OF A REGISTERED USER ON A NETWORK

(71) Applicant: Unify GmbH & Co. KG, Munich (DE)

(72) Inventors: Andreas Reinhardt, Kingsford (AU); Johannes Schmitt, Darmstadt (DE); Jurgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 81 days.

This patent is subject to a terminal disclaimer.

(21) Appl. No.: 15/923,596

(22) Filed: Mar. 16, 2018

(65) Prior Publication Data

US 2018/0213047 A1 Jul. 26, 2018

Related U.S. Application Data

(63) Continuation of application No. 14/481,985, filed on Sep. 10, 2014, now Pat. No. 9,961,153.

(30) Foreign Application Priority Data

Sep. 11, 2013 (DE) .......................... 10 2013 015 156

(51) Int. Cl.
*G06F 15/16* (2006.01)
*H04L 29/08* (2006.01)
(Continued)

(52) U.S. Cl.
CPC .......... *H04L 67/24* (2013.01); *G06F 16/1834* (2019.01); *G06F 16/9535* (2019.01);
(Continued)

(58) Field of Classification Search
CPC ....... H04L 67/24; H04L 51/043; H04L 51/32; H04W 4/21; G06F 16/9535; G06F 16/1834
(Continued)

(56) References Cited

U.S. PATENT DOCUMENTS 6,987,847 B1 1/2006 Murphy et al.
8,443,115 B2 5/2013 Kotzin
(Continued)

FOREIGN PATENT DOCUMENTS

EP 2493166 A1 8/2012
EP 2629486 A1 8/2013
WO 2009043020 A2 4/2009

*Primary Examiner* — Alan S Chou
(74) *Attorney, Agent, or Firm* — Buchanan Ingersoll & Rooney PC

(57) ABSTRACT

The invention relates to a presence status determination system and a computer implemented method to determine the presence status of a first user registered in a network and to communicate this presence status to a second user, who would like to make contact with the first user. An input device for a presence status determination device records a predetermined first presence status component determined by the first user and forwards the first presence status component to the presence status determination device (20). A contact person registration device records the identity of the second user and reports the identity to a relationship determination device. The relationship determination device determines, with the aid of a computer, a second presence status component, which considers the social proximity between the first user and the second user. The presence status determination device determines the presence status of the first user taking into account the first presence status component and the second presence status component. Then
(Continued)

a presence status communications device communicates the determined presence status of the first user to the second user.

20 Claims, 2 Drawing Sheets

(51) Int. Cl.
*H04W 4/21* (2018.01)
*G06F 16/182* (2019.01)
*G06F 16/9535* (2019.01)
*H04L 12/58* (2006.01)

(52) U.S. Cl.
CPC ............. *H04L 51/043* (2013.01); *H04W 4/21* (2018.02); *H04L 51/32* (2013.01)

(58) Field of Classification Search
USPC ........................................................ 709/206
See application file for complete search history.

(56) References Cited

U.S. PATENT DOCUMENTS

| | | |
|---|---|---|
| 9,063,649 B2 | 6/2015 | Kim |
| 9,117,197 B1 | 8/2015 | Sharma |
| 9,706,398 B2 | 7/2017 | Frederick et al. |
| 9,961,153 B2 * | 5/2018 | Reinhardt ............ G06F 16/1834 |
| 2003/0190602 A1 | 10/2003 | Pressman et al. |
| 2007/0067443 A1 | 3/2007 | Seligmann et al. |
| 2007/0130260 A1 | 6/2007 | Weintraub et al. |
| 2007/0143433 A1 | 6/2007 | Daigle |
| 2008/0112567 A1 | 5/2008 | Siegel et al. |
| 2008/0132243 A1 | 6/2008 | Spalink et al. |
| 2008/0260169 A1 | 10/2008 | Reuss |
| 2008/0261660 A1 | 10/2008 | Huh et al. |
| 2008/0299948 A1 | 12/2008 | Rosener |
| 2009/0006613 A1 | 1/2009 | Toutain et al. |
| 2009/0047972 A1 | 2/2009 | Neeraj |
| 2009/0141884 A1 * | 6/2009 | Lyman .................... H04L 51/14 379/265.02 |
| 2009/0305632 A1 | 12/2009 | Sarkissian et al. |
| 2010/0198742 A1 | 8/2010 | Chang et al. |
| 2010/0315417 A1 | 12/2010 | Cho et al. |
| 2012/0274445 A1 | 11/2012 | Chin et al. |
| 2012/0297305 A1 | 11/2012 | Hehmeyer et al. |
| 2012/0311045 A1 | 12/2012 | Sylvain |
| 2013/0191458 A1 | 7/2013 | Krishnan et al. |
| 2013/0217350 A1 | 8/2013 | Singh |
| 2013/0282430 A1 * | 10/2013 | Kannan .................. G06Q 30/02 705/7.29 |
| 2013/0297554 A1 | 11/2013 | Mah |

\* cited by examiner

SYSTEM AND METHOD TO DETERMINE THE PRESENCE STATUS OF A REGISTERED USER ON A NETWORK

CROSS-REFERENCE TO RELATED APPLICATIONS

This application is a continuation application of U.S. patent application Ser. No. 14/200,758, which claims priority to German Patent Application No. DE 102013004363.8, filed on Mar. 12, 2013.

FIELD OF THE INVENTION

The present invention relates to a computer-aided method to determine the presence status of a first user registered in a network and communicating this presence status to a second user, who would like to make contact with the first user. The present invention also relates to a presence status determination system, with which the method can be performed.

BACKGROUND OF THE INVENTION

People who work with the further development of technology dealing with highly specialized expertise (also referred to as "knowledge workers"), require various means of communication and are dependent on their interconnectivity. Conversely, they dislike being disrupted while they are under a cognitive load, for example during a concentration phase or while solving a difficult problem. In addition to electronic communications personal communications, such as a two-party conversation or a meeting with multiple participants, is still important. The level of disruption, which is still perceived as acceptable, can depend on the relationship between these employees and their respective visitors. In other words this means that a visitor who has social ties to the individual is not perceived as an unwelcome interruption, while the interruption by a stranger may be perceived as very disruptive or even as totally unacceptable.

SUMMARY OF THE INVENTION

The visibility and/or an indication of the availability or accessibility of a person, for example, in UC-systems (Unified Communication Systems), can be realized via a presence status, which is assigned to the person in question. This is however very limited, because one has to rely that the presence status is set accurately globally by the respective user himself or herself and that it is set exclusively or predominantly manually regardless of a presence monitoring system and regardless of the sensitivities of the respective user. Additionally the presence status only allows a small number of simple conditions or statuses without further explanatory information. In the currently available implementations of UC presence indication such as "busy" or "do not disturb" are only recommendations for those who view the presence status, and such a presence status is not suitable to enforce any act—for example, not to enter in case of a "do not disturb" sign. For ad hoc face-to-face discussions or meetings often an audio and/or video call is used to prepare for and/or convene the meeting, which can be again perceived as disruptive.

The task of the invention is based on better consideration of the personal needs of users of a network in terms of their presence status by use of technical means and a method to determine the presence status as well as provide a corresponding presence status determination system.

The following is intended to provide guidance as to how according to the present invention the degree of relationships, contacts etc. between a first user, who is registered in a network, and a second user, who represents a potential visitor, can be used to determine whether the second user may get in touch with the first user or not. This level of relationship, intensity and/or frequency of contacts etc. is also referred to as a "social proximity".

According to the invention a computer implemented method to determine the presence status of a first user registered in a network and communicating this presence status to a second user, who would like to make contact with the first user is processed in the following steps: An input device (for example, a software or mechanical slider, an application on a smartphone, tablet, or PC) for a presence status determination device takes note of a first presence status component as determined by the first user and forwards the first presence status component to the presence status determination device. In other words, the first user may indicate or specify as the first presence status component that he/she is absent or for example may only be disturbed if it is really important. A contact person recording device records the identity of the second user—for example, using RFID, by registering a fingerprint or through the receipt of a user code entered by the second user, which is representative of him/her—and reports the identity either directly or for example through a central control unit to a relationship determination device. The computer-aided relationship determination device then determines, i.e. by means of a dedicated CPU, computer etc., a second presence component, which considers the social proximity between the first and the second user. The presence status determination device then determines the presence status of the first user, taking into account the first and the second presence status component; subsequently a presence status communications device forwards the determined presence status of the first user to the second user. As a result this may, for example, lead to that a second user, who wants to call the first user, receives a busy sign because the first presence status component "only disturb if important" is set by the first user, while a second user, who is a good friend of the first user and wants to call him under the same conditions receives a dial tone based on their greater social proximity.

It is clear that an improvement in terms of possibilities can be achieved according to the invention for a user registered in a network who wants to be available or reachable by those persons, for whom it is desired, while others for example can only be in contact with the user, if it is really important.

In accordance with an advantageous embodiment of the invention the method for the determination of the second presence status component at least one of the following information, which is also known as context information, is considered: First data set about the second user, which is found in the first user's digital devices; second data sets from social networks (including business networks), through which the first user is connected with the second user; and third data sets about the second user which are found on the digital devices of the second user and to which the presence determination device has access.

It may be advantageous, if one or several of the following information elements are used for the creation of the context information: Entries in various calendars, data about phone calls (between the two individuals involved), location information, e-mail, SMS, MMS, mailing lists, Twitter messages, chat, contacts from contact lists or social networks, as well as data on the usage and frequency of use with respect to the above items.

Thus, it can be seen that the second presence status component can be determined to enable and facilitate the visit or contact with the first user, dependent on the relative frequency, length, and intensity, etc. of the past contacts with the first user.

For the first user, this presents a major advantage that automatically—that is, through use of technical means and without having to do anything—a pre-selection can be made on whether the user can or should be disturbed if necessary and the user is therefore not distracted, nor has to worry about whether he is available for the respective potential visitor or business contact.

Preferably naive Bayes algorithm can be used in a way that is advantageous for the calculation of the social proximity between the first user and the second user. It is assumed that all parameters are statistically independent of each other.

Another advantageous method to learn the weighting factors for the evaluation of the respective context information is a so-called C4.5-method to build a decision tree.

A presence status determination system according to the invention encompasses a presence status determination device with an input device for the receipt of a presence status component as determined by the first user for determining the presence status of a first user registered in a network whereas the component is accepted or entered by the first user and to communicate the presence status to a second user, who wants to make contact with the first user and for the forwarding of the first presence status component to the presence status determination device. The input device can be, for example, a conventional computer keyboard or mouse, or a so-called "slider" in the form of a mechanical or a software slider, which allows a setting on a scale with which for example, a particular application can be controlled, either on a smartphone, laptop or conventional desktop computer. It also includes a contact person registration device to register the identity of the second user, which can be in the form of a vicinity recognition system such as fingerprint reader, a keypad to enter a personal code of the second user, etc. The system also includes a relationship determination device for receiving the identity of the second user, which is sent by the contact person registration device, and for determination of a second presence status component, which considers the social proximity between the first user and the second user. The presence status determination device is developed in such a way that the presence status of the first user is determined under consideration of the first and second presence status component. Finally, a presence status communications device transmits the determined presence status of the first user to the second user. This transmission can be an appropriate message sent to the phone of the second user when the second user tries to call the first user.

In accordance with an advantageous development of the invention the presence status determination system is connected to a system with a display indicator for displaying of a certain first presence status component as set by a first user for potential visitors, who want to contact the first user. The display indicator for example, is essentially in the shape of a cube (be it with rounded edges, be it with receding or protruding surfaces) or formed as a multifaceted polyhedron, which can be rotated in space, for example by the first user or by an actuator controlled by the first user, is arranged such that one of its surfaces faces the potential visitor. Several of the areas of the cube are designed as a display surface, on which respectively the first user determined first presence status component can be displayed. The system also features a device for the transmission of the first presence status component to communication devices of potential visitors nearby and/or to the presence status determination system. This allows the first user to set the cube mechanically according to his preferences for availability, without having to rely on an electronic medium, and this information is then transmitted automatically to electronic devices of potential visitors, who, for example may stand in front of the cube, so that these can determine by using their device based on the determined presence status obtained from the presence status determination device and transmitted by the presence status communications device if they have in fact access to the first user.

It is of advantage if the cube has a sensor, such as a three-dimensional gravity sensor, with which the position of the cube in space can be automatically determined and thus the associated displayed information can be detected via the first presence status component of the first user.

It may be of advantage, to be able to provide even more detailed information on the presence status of the first user in terms of his social proximity to the potential visitor. Accordingly, the present invention can be integrated as additional sensors in a pre-existing presence status determination system.

Further advantages, characteristics and features of the present invention are shown in the following description of advantageous embodiments with reference to the drawing. It shows schematically:

DESCRIPTION OF THE PREFERRED EMBODIMENTS

Figure 1:
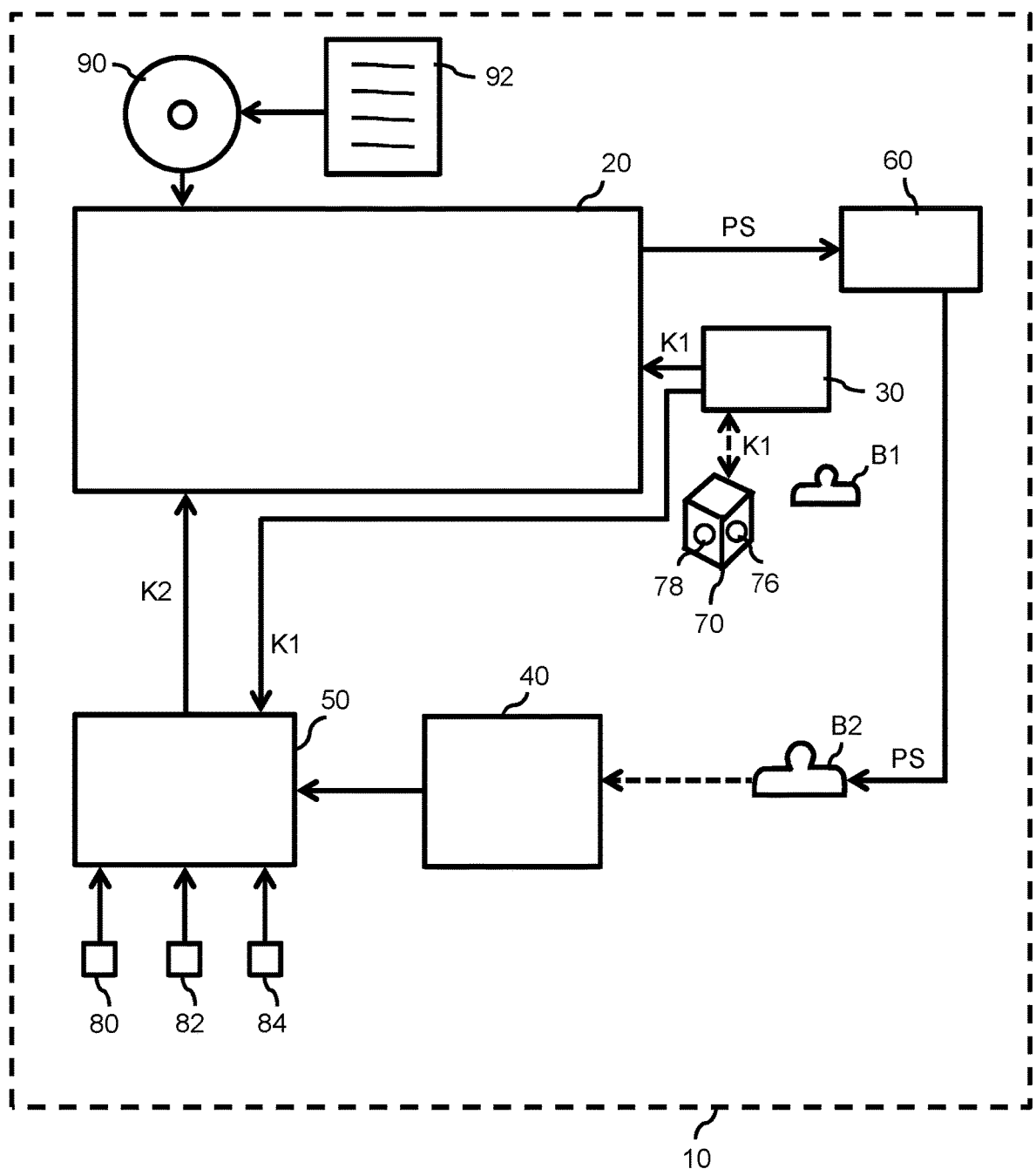
FIG. 1 is a schematic overview of an embodiment of a presence status determination system according to the invention.

FIG. 1 shows a presence status determination system according to the invention (also referred to in short as "system") 10. The system 10 includes as one of the central units a presence status determination device 20, for example in the form of a CPU on which a corresponding software program can run. An input device 30 is connected to the presence status determination device 20. The input device could be, for example, in the form of a connected keyboard or touch screen. The input device 30 is associated with a first user B1, who is shown here schematically. The first user B1 can enter a first presence status component (short "First Component") K1 into the input device 30, which is forwarded to the presence status determination device 20. The first component K1 can consist of an indication such as "busy", "available", "out of office" or "only if important". This first component can be displayed on a display device 70, which is in the form of a cube or other polyhedron structure, and on which at least some, or even all of its sides are flat surfaces 72, 73, 74 (see also FIG. 3). Thus, a potential visitor B2 (also called "second user B2") can recognize, which first component K1 the first user B1 has entered, that is, with which (provisional or subjective) presence status the first user B1 rates himself.

The cubic display device 70 has a three-dimensional gravity sensor 78, with which it can determine its position in space and therefore determine which display is facing a second user B2. The indicator 70 is designed in such a way that either the first user B1 can turn and therefore adjust it according to the chosen subjective presence status, or that the cubic display 70 is designed in such a way that it can be adjusted accordingly by the first user B1 using an actuator (not shown) or manually. The display indicator 70 also features an interface 76, with which the first component K1 can be transmitted wirelessly to nearby electronic devices. By this these electronic devices of second users B2 "know" which provisional or subjective presence status has been set by the first user B1.

Additionally a contact person registration device 40 is connected to the presence status determination device 20, which is intended to record the identity of the second users B2. The capture can occur for example, using an RFID chip, a fingerprint reader, a retina scanner, a video system with face detection, entry of a personal code of the second user B2 or the like. A relationship determination device 50 is intended in the system 10 which determines, with the aid of a computer, a second presence status component K2 (for short "Second Component K2"), which takes the social proximity between the first user and the second user into account. The relationship determination device 50 can access any combination of the following elements or information elements, which can be stored in own databases 80, 82, of communication devices or other storage media 84 for the determination of the social proximity. These storages or databases can for example be assigned to the first user B1 or the second user B2 and belong to the appropriate social networks or can be connection and metadata of the telecommunications providers, whereas the access to this storage can occur for example over the Internet, whether wire based or wireless. Examples of such data are: calendar entries, telephone connection data, location data (for example obtained via GPS), E-mail, SMS, MMS, mailing lists, Twitter messages, chat, contacts from contact lists of the users B1 and B2 or social networks, usage lengths and frequency of certain services etc. These are also called "contextual information" and allow the determination of social proximity between a potential visitor B2 and a first user B1. To determine the relative relationship of these individuals to each other, the membership in contact groups, the contents of various messages or the spatial distance between the respective users over a given time frame can be used. It can also be of benefit, if existing presence systems, such as those in UC systems (such as the Open Scape-System of the applicant) can be used as an additional integrated media, in order to further enhance the information content.

From all this contextual information the relationship determination device 50 determines the second component K2 and provides the second component K2 to the presence status determination device 20. This in turn determines from the first component K1 and the second component K2 the presence status PS of the first user. The relationship determination device 50 also provides the presence status PS to a connected presence status communications device 60 in order to transmit the presence status PS of the first user B1 to the second user B2, who has indicated that he wants to contact the first user B1. This can be, for example an attempted call to the first user B1 or an approach to his door.

The second user B2 is informed by the presence status PS fine-tuned in this manner. Then user B2 will know if the first user B1 is in a sufficiently "negative" subjective presence status resulting from the first component K1 that B2 can indeed not disturb the first user B1 or if he can be allowed to see B1 due to his close social proximity.

In particular, in case of an attempted call of the second user B2 to the first user B1 the advantage of the present invention becomes apparent as the user B1 will not know of the potential disruption by an attempted call, provided that the user B2 is in fact not entitled to disturb him. If necessary, an answering machine can be switched on in this situation, or the call can be diverted elsewhere. It is also possible to arrange an automatic callback, as soon as the first user B1 loosens the restrictive presence status again, and reports his status again as "available". Alternatively, it can also be provided that the second user B2 who has not gained access to the first user B1 will be sent a message, in which he is asked when he wants to be contacted.

From the above description it can be seen that a paradigm shift is possible through the application of the present invention: Instead of the preventing a most efficient call forwarding or connection to a user of the communication system as was customary until now, it is now possible to avoid disruptive calls or other interruptions in view of the workload and the presence status desired by the first user B1, taking into account the social proximity to a potential visitor B2.

The display indicator 70 for example, at the door of a user provides an interface to a possible visitor. On the one hand the display indicator 70 allows to show information about the current presence status of the first user and, on the other hand, this interface allows to identify the visitor.

Following some examples are mentioned of how the social proximity in the relationship determination device 50 can be run, while it is located for example, in a desktop computer, a smartphone or a server of a communication system. A beneficial method for this purpose is the so-called naive Bayes algorithm. For this a series of parameters are being evaluated, which are obtained from the contextual information. In particular such parameters are of interest, which can provide information about the relationship between the affected individuals. In particular information about a direct interaction between these individuals can be obtained, for example, from telephone calls to desktop phones, mobile phones or smartphones be obtained. However, e-mails and chats on instant messaging systems or social networks can also be used. For this the so-called interaction history of the respective user will be used. The social proximity can for example be shown on a scale of 0 (no relationship or maximum social distance) to 1 (strong relationship or great social proximity). This can lead to certain social types of distance by using certain weighting factors, including, for example, a distinction between personal relationships and business contacts. However, for example, a distinction can be made between family members and friends or team members or staff. The weight factors can either be statically defined using expert knowledge, or they can be obtained by use of "data mining technologies" and representative training data, which are associated with the perceived social proximity. These training data can be obtained by means of an appropriate feedback from the users themselves—for example, by a corresponding "slider for social proximity", or another display indicator—in order to set or correct the perceived social proximity to another person based on an interaction with this person.

For the determination of the weighting factors for example, the naive Bayes algorithm can be used as a learning process. The naive Bayes algorithm "learns" the conditional probability p(s|X) for a specific status s (for example, a statement about a social proximity as status—e.g. personal contact, business contact, unknown, etc.) in relation to the values of a set of parameters X={x1, x2, . . . , xn} (in this case, the contextual information). The method uses the training data to derive the probability p(s|X) on the basis of the Bayes-algorithm p(s|X)=p((x|s) p(s))/p(x). The application of the "naive" assumption that all parameters are statistically independent of each other, leads to a formula p(s|X)=p(s) p(x1|s) p(x2|s) . . . p(xn|s). The term p(s) can be determined by dividing the number of cases in which training data are determined, in which the given status s is present, divided by the total number of cases. The term p(x|s) can be obtained by using the cases in the training data where the status s is used, the percentage is determined, by which the value of x is valid in relation to other values of the status s. In practice this means that during the evaluation the probabilities (the "weight factors") for the values of the relevant contextual information will be multiplied by the overall probability of the status s. As a result, the status with the highest probability can be provided.

An alternative method to determine the weight factors is the C4.5-method under which a decision tree is built and weighting factors are learned for the evaluation of the values for the rich contextual information. During the learning phase the method evaluates entropy reduction regarding the status s, if the training data are divided by the individual parameters x. Those parameters, which the entropy reduces the most (which means, the highest influence on the decision), are used as the root of the decision tree. The resulting parameter is the highest "weighted", and it is first evaluated later in the decision. The following method uses the partial results recursively in the same way, in order to generate the entire decision tree, which means that the following parameters will be depending on the conditions of the previous "weighted".

Figure 2:
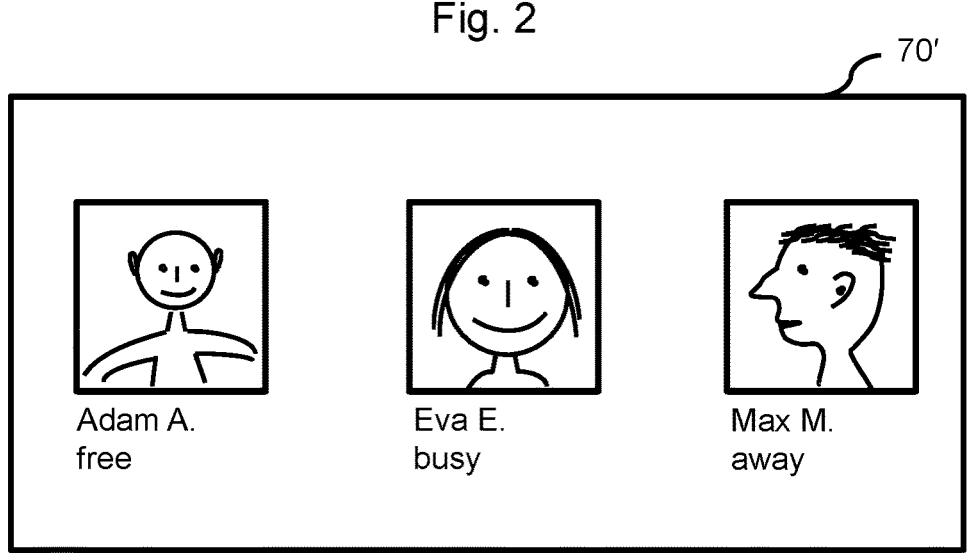
FIG. 2 is a schematic representation of a display, on which several persons are shown with their respective presence status as users of the presence status determination system.
Figure 3:
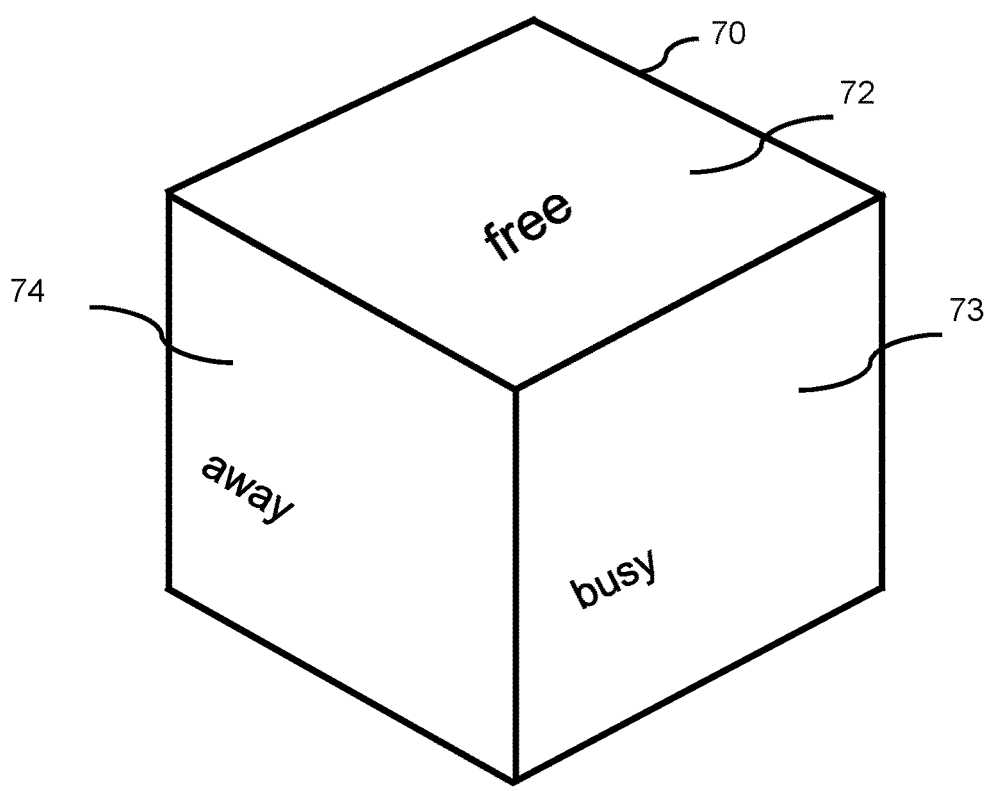
FIG. 3 is a schematic representation of a cube shaped display for a presence status determination system according to the invention.

In FIG. 2 an example is shown of a display indicator 70, in which three different, symbolically represented users are shown respectively with a picture, the name and their first component K1 "available", "busy" or "away". When an attempt is made to call one of these individuals while using a display indicator 70 for example the page can be displayed on a smartphone or desktop phone. The corresponding components K1 can each be set with a cube-shaped display indicator 70, as shown in FIG. 3. Of course, the component K1 can be set by means of other inputs, such as described in detail above.

The cube-shaped display instrument 70 according to FIG. 3 has several different display surfaces 72, 73, 74 on which defined presence statuses are displayed as a respective first component. In the example of FIG. 3 the presence statuses "free" "busy" and "away" are shown. Similar terms such as "available" or "absent" could be used. The cube will automatically display the desired setting by turning the cube so that the desired display area with the intended statement about the presence status is shown to a potential visitor. As soon as a potential user steps in front of the display indicator 70 which for instance serves as a door sign, the potential visitors can see the display as set by the first user B1. It is an advantage if such potential visitor B2 also is identified from the display instrument 70. In this case, the potential visitors B2 is informed directly whether he—if necessary in spite of an initially unfavorable presence status of the first user B1—can contact him. That could be permitted if the second user has a sufficiently close social proximity to the first user B1. It may be beneficial for a second user B2 if he is provided additional information such as when the current calendar event, which creates the busy status of the first user, ends. In other situations the second user B2 will be told when the current conference call, the current telephone call or the intensive phase, which occupies the first user B1 is (expected) to come to an end. If the information also depends on the social proximity, a possible second user B2 can potentially benefit from the fact that he is in close social proximity to the first user B1 and he can therefore relatively soon contact him.

It is understood that the computer-aided method as well as the presence status determination system according to the present invention are closely related. It is therefore obvious that certain characteristics, features and benefits, which have been described, for example in connection with the system apply in an equal or similar manner to the method, and vice versa.

As described above, a "one size fits all" system for indicating a presence status and the willingness, as appropriate, to be interrupted or disrupted by a potential visitors, are often not desirable or appropriate, however often depend on the relationship of the potential visitor to the potentially visited. To appropriately consider this relationship or the social proximity between the respective individuals, without burdening or interrupt the potentially visited with the decision whether or not he actually wants to be disturbed, a computer-aided presence status determination system as proposed by the invention is suggested, in order to automatically answer these questions without the burdening of individuals.

It must be noted that the described features under reference to the specific embodiments of the described features of the invention, for example such as the type and design of the individual components of the presence status determination system or the sequence of the individual steps of the method, may be present in other embodiments, except when it is specified otherwise or for technical reasons is not possible.

What is claimed is:
1. A computer-aided method to determine a presence status of a first user registered in a network and to communicate this presence status to a second user, who would like to make contact with the first user associated with a first presence status component so that the first user can avoid interruption from the second user when the first user does not want to be disturbed without personally interacting with the second user, the method comprising:
a relationship determination device determining a second presence status component for the second user, which considers social proximity between the first user and the second user, the relationship determination device having a processor and being communicatively connected to at least one data store stored in non-transitory memory, the social proximity being determined by the relationship determining device for determining the second presence status component such that a conditional probability p(s|X) for a given social proximity s is determined for determining the second presence status component by utilizing a formula:

$$p(s|X)=p(s)p(x1|s)p(x2|s) \ldots p(xn|s),$$

where p(x|s) is determined by use of data in which social proximity s is given and by determining a proportion in which a value of x in relation to other values of the social proximity s is valid;

sending a presence status of the first user to a device associated with the second user based on the determined second presence status component to communicate the presence status of the first user to the second user based on the social proximity the second user has to the first user so the second user can be aware of the presence status of the first user that is specific to the social proximity the second user has to the first user before the second user attempts a communication with the first user such that the second user can avoid interrupting the first user when the presence status of the first user indicates the first user does not want to be interrupted by the second user.

2. The method according to claim 1, wherein the second presence status component is determined by considering at least one of the context information selected from the group consisting of first data on the second user; second data from social networks to which the first user is connected with the second user and which are stored in one or more digital devices of the first user; and third data on the second user to which the presence status communications device has access and which is stored in one or more digital devices of the second user.

3. The method according to claim 2, wherein at least one of the following elements is used for creation of the context information: calendar entries, phone connection data, location information, e-mail, SMS, MMS, mailing lists, Twitter messages, chat, contacts from contact lists or social networks, usage duration and usage frequency.

4. The method according to claim 3, wherein a C4.5-method is used to learn weighting factors for evaluation of respective context information, and to form a decision tree.

5. The method according to claim 2, wherein a C4.5-method is used to learn weighting factors for evaluation of respective context information, and to form a decision tree.

6. The method according to claim 1, wherein a naive Bayes algorithm is used for calculating of the social proximity.

7. The method according to claim 1, wherein a C4.5-method is used to learn weighting factors for evaluation of respective context information, and to form a decision tree.

8. A presence status determination apparatus to determine a presence status of a first user registered in a network and to communicate this presence status to a second user, who would like to make contact with the first user, comprising:
a relationship determination device having a processor, the relationship determination device communicatively connectable to a contact person registration device to receive an identity of the second user from the contact person registration device, the relationship determination device configured to determine a second presence status component based on a determined social proximity between the first user and the second user, the relationship determination device communicatively connected to a non-transitory computer readable medium having at least one data store stored therein, the social proximity being determined by the relationship determination device for determining the second presence status component such that a conditional probability $p(s|X)$ for a given social proximity s is determined for determining the second presence status component by utilizing a formula:

$$p(s|X)=p(s)p(x1|s)p(x2|s)\ldots p(xn|s),$$

where $p(x|s)$ is determined by use of cases in training data in which social proximity s is given and by determining a proportion in which a value of x in relation to other values of the social proximity s is valid;

the relationship determination device communicatively connectable to a presence status determination device to provide the second presence status component to the presence status determination device.

9. The presence status determination apparatus of claim 8, comprising:
the presence status determination device, the presence status determination device configured to determine a presence status of the first user based on the second presence status component and a first presence status component for sending the presence status to a device associated with the second user to communicate the presence status of the first user to the second user so the second user can be aware of the presence status of the first user before the second user attempts a communication with the first user such that the second user can avoid interrupting the first user when the presence status indicates the first user does not want to be interrupted by the second user.

10. The presence status determination apparatus of claim 9, also comprising:
a display indicator for displaying a predetermined first presence status component as determined by a first user for a second user who wants to contact the first user, the display indicator shaped as a polyhedron having several flat surfaces and being able to swivel in space so that one of its surfaces is facing potential visitors, each flat surface having a display area for the first user determined first presence status component, and
a transmission device, which is intended for the transmission of the first presence status component to at least one nearby situated communication device of a potential visitor and to the presence status determination system, and is connected to the display.

11. The presence status determination apparatus of claim 10, also comprising a sensor connected to the display which records a position of the display in space.

12. The presence status determination apparatus of claim 9, wherein the display indicator is cube-shaped.

13. A non-transitory computer readable medium having a program stored thereon, the program defining a method that is performed by a communication apparatus when the program is run by a processor of the-communication apparatus, the method comprising:
in response to receiving an identity of a second user from a contact person registration device, determining a second presence status component that considers social proximity between a first user and the second user, the social proximity being determined for determining a second presence status component such that a conditional probability $p(s|X)$ for a given social proximity s is determined for determining the second presence status component by utilizing a formula:

$$p(s|X)=p(s)p(x1|s)p(x2|s)\ldots p(xn|s),$$

where $p(x|s)$ is determined by use of cases in training data in which social proximity s is given and by determining a proportion in which a value of x in relation to other values of the social proximity s is valid;

sending the second presence status component to a presence status determination device.

14. The non-transitory computer readable medium according to claim 13, wherein the second presence status component is determined by considering at least one of the context information selected from the group consisting of first data on the second user; second data from social networks to which the first user is connected with the second user and which are stored in digital devices of the first user; and third data on the second user which is stored in digital devices of the second user.

15. The non-transitory computer readable medium according to claim 14, wherein a C4.5-method is used to learn weighting factors for evaluation of respective context information, and to form a decision tree.

16. The non-transitory computer readable medium according to claim 14, wherein at least one of the following elements is used for creation of the context information: calendar entries, phone connection data, location information, e-mail, SMS, MMS, mailing lists, Twitter messages, chat, contacts from contact lists or social networks, usage duration and usage frequency.

17. The non-transitory computer readable medium according to claim 14, wherein the second presence status component is sent to the presence status determination device so that a presence status of the first user is determinable based on a first presence status component and the second presence status component for sending the presence status to a device associated with the second user to communicate the presence status of the first user to the second user so the second user can be aware of the presence status of the first user before the second user attempts a communication with the first user such that the second user can avoid interrupting the first user when the presence status indicates the first user does not want to be interrupted by the second user.

18. The non-transitory computer readable medium according to claim 13, wherein a naive Bayes algorithm is used for calculating of the social proximity.

19. The non-transitory computer readable medium according to claim 13, wherein a C4.5-method is used to learn weighting factors for evaluation of respective context information, and to form a decision tree.

20. The non-transitory computer readable medium according to claim 13, wherein the second presence status component is sent to the presence status determination device so that a presence status of the first user is determinable based on a first presence status component and the second presence status component for sending the presence status to a device associated with the second user to communicate the presence status of the first user to the second user so the second user can be aware of the presence status of the first user before the second user attempts a communication with the first user such that the second user can avoid interrupting the first user when the presence status indicates the first user does not want to be interrupted by the second user.

* * * * *